(12) United States Patent
Francke

(10) Patent No.: US 11,285,816 B2
(45) Date of Patent: Mar. 29, 2022

(54) CURRENT COLLECTOR FOR MULTI-POLE CONTACT LINE SYSTEM

(71) Applicant: SIEMENS MOBILITY GMBH, Munich (DE)

(72) Inventor: Juergen Francke, Berlin (DE)

(73) Assignee: Siemens Mobility GmbH, Munich (DE)

( * ) Notice: Subject to any disclaimer, the term of this patent is extended or adjusted under 35 U.S.C. 154(b) by 282 days.

(21) Appl. No.: 16/487,710

(22) PCT Filed: Feb. 22, 2018

(86) PCT No.: PCT/EP2018/054379
§ 371 (c)(1),
(2) Date: Aug. 21, 2019

(87) PCT Pub. No.: WO2018/153983
PCT Pub. Date: Aug. 30, 2018

(65) Prior Publication Data
US 2020/0231044 A1     Jul. 23, 2020

(30) Foreign Application Priority Data
Feb. 24, 2017   (DE) .......................... 102017203046.1

(51) Int. Cl.
*B60L 5/36* (2006.01)
*B60L 5/20* (2006.01)
(Continued)

(52) U.S. Cl.
CPC .................. *B60L 5/36* (2013.01); *B60L 5/20* (2013.01); *B60L 5/22* (2013.01); *B60L 5/28* (2013.01); *B60L 5/42* (2013.01); *H01R 41/00* (2013.01)

(58) Field of Classification Search
CPC ...... B60L 5/20; B60L 5/00; B60L 5/04; B60L 5/08; B60L 5/12; B60L 5/18; B60L 5/22;
(Continued)

(56) References Cited

U.S. PATENT DOCUMENTS 1,509,521 A    9/1924  Matthes
5,124,510 A *  6/1992  Garfinkle ................. B60L 5/19
                                                    191/59.1
(Continued)

FOREIGN PATENT DOCUMENTS

CN    104149631 A    11/2014
CN    104999915 A    10/2015
(Continued)

*Primary Examiner* — Zachary L Kuhfuss
*Assistant Examiner* — Cheng Lin
(74) *Attorney, Agent, or Firm* — Laurence A. Greenberg; Werner H. Stemer; Ralph E. Locher

(57) ABSTRACT

A current collector for a multi-pole contact line system has a lower arm that is pivotally mounted on a base and at least two upper arms that are pivotally mounted on an end of the lower arm opposite the base. The current collector also has at least two contact assemblies that are arranged on the respective upper arms and are associated with separate different poles of a contact line. The current collector further has a central compensating rocker arranged on the base and at least two connecting rods, the first end of each of which is pivotally connected to the central compensating rocker and the second end of each of which is pivotally connected to one of the at least two upper arms. An electrified transport system uses such a current collector.

12 Claims, 4 Drawing Sheets

(51) Int. Cl.
*H01R 41/00* (2006.01)
*B60L 5/22* (2006.01)
*B60L 5/28* (2006.01)
*B60L 5/42* (2006.01)

(58) Field of Classification Search
CPC ...... B60L 5/24; B60L 5/26; B60L 5/28; B60L 5/36; B60L 5/42; B60L 2200/26; B60L 2200/36; B60L 5/19; B60L 9/00; H01R 41/00
See application file for complete search history.

(56) References Cited

U.S. PATENT DOCUMENTS

| | | |
|---|---|---|
| 6,418,397 B1 | 7/2002 | Brand et al. |
| 9,450,321 B2 | 9/2016 | Gamsjaeger |
| 9,643,495 B2 * | 5/2017 | Kanazawa ................ B60L 5/26 |
| 2015/0239349 A1 | 8/2015 | Keil |

FOREIGN PATENT DOCUMENTS

| | | | |
|---|---|---|---|
| DE | 19725906 C1 | 2/1999 | |
| DE | 19814417 C1 | 9/1999 | |
| DE | 102012213460 A1 * | 2/2014 | ................ B60L 7/18 |
| DE | 102012213460 A1 | 2/2014 | |
| DE | 102013202671 A1 | 8/2014 | |
| EP | 2857252 A1 | 4/2015 | |
| FR | 2506234 A1 * | 11/1982 | ................ B60L 5/36 |
| JP | H9308002 A | 11/1997 | |
| WO | 2013124996 A1 | 8/2013 | |

\* cited by examiner

CURRENT COLLECTOR FOR MULTI-POLE CONTACT LINE SYSTEM

BACKGROUND OF THE INVENTION

Field of the Invention

The invention relates to a current collector for a multi-pole contact line system. The invention also relates to an electrified transport system.

Electric transport systems for transporting goods and persons, having contact lines for supplying electrical energy to vehicles are used in many different variants. Two-pole overhead line systems fed with current are conventionally used when using lane-bound supply systems for non-rail-bound vehicles. The two-pole overhead lines are arranged above electrified traffic lanes and are contacted by electrified utility vehicles with the aid of actively readjusting current collectors. Rougher deviations from an intended lane are compensated with the aid of a driver assistance system, which thereby allows the vehicle to be driven within a permissible tolerance below the overhead lines.

With the aid of the actively readjusting current collectors, considerable variations, caused by structural system features or temporary environmental conditions, in the horizontal and vertical position above the lane are compensated in comparison to the nominal position. For example, for the readjustment of the current collector, electrified road vehicles have a contact line detector whose information is used to control the current collector. A lateral deflection of the current collector or its wearing strips is carried out during the adjustment. Considerable technical effort has to be expended for permanent uniform contacting of a two-pole contact line.

The problem therefore exists of developing a pantograph which, with less outlay than in conventional systems, enables optimally uninterrupted multi-pole contact with an overhead line during the journey of an electrified vehicle.

SUMMARY OF THE INVENTION

This object is achieved by a current collector for a multi-pole contact line system as claimed.

The inventive current collector for a multi-pole contact line system comprises a lower arm which is pivotally mounted on a base. The lower arm is also referred to below as the bottom arm. A lower arm of this kind is preferably pivotal about a first axis in the transverse direction, in other words perpendicular to the course of the contact line and to the direction of travel of an electrified vehicle equipped with the current collector. The terms "bottom arm" or "lower arm", which are used synonymously in the application, are in this application intended to mean that is the corresponding supporting arm of the current collector is arranged in the direction of the base. Furthermore, the inventive current collector has at least two upper arms, also called top arms, pivotally mounted relative to each other on an end of the lower arm opposite the base. The terms "top arm" or "upper arm", which are used synonymously in the application, are in this application intended to mean that the corresponding supporting arm of the current collector is arranged in the direction of the contact line or on the side facing away from the base when the current collector is in contact with the contact line. The at least two upper arms can be pivoted relative to the lower arm about a preferably common second axis, which runs parallel to the first axis. In addition, the at least two upper arms can also be pivoted relative to each other. Preferably, the at least two upper arms have the same dimensions. The two upper arms can therefore assume different pivoting positions within certain limits, so, for example, height differences between different contact wires or poles of the contact line can be compensated. The term "poles" should in this application be taken to mean contact wires with different electric potential or different phases. In the case of direct current systems, different potentials are present on the different contact wires, while in the case of alternating current or three-phase current systems, individual contact wires have different phases.

In addition, forming part of the inventive current collector are at least two separate contact assemblies arranged on the respective upper arms and associated with different poles of a contact line. These contact assemblies serve to establish a contact between the current collector and the contact wires of the multi-pole contact line system. Contact assemblies of this type can be designed, for example, as contact rockers which each have a plurality of wearing strips.

The inventive current collector comprises, moreover, a central compensating rocker arranged on the base and at least two connecting rods whose first end is pivotally connected to the central compensating rocker respectively and whose second end is pivotally connected to one of the at least two upper arms respectively. With the aid of the compensating rocker, pivoting movements of the connecting rods about an axis running parallel to the first axis are made possible in the case of differently polarized contact wires running at exactly the same height. The compensating rocker also permits a pivoting movement of the compensating rocker perpendicular to the first axis, so the at least two connecting rods can be displaced parallel to each other when, for example, the at least two differently polarized contact wires run at a slightly different height. The two connecting rods exert tensile forces on the at least two upper arms, with the aid of which the two contact rockers are pressed against the contact wires of the contact lines. With the aid of the compensating rocker, the two contact assemblies are each pressed against the differently polarized contact wires with the same contact pressure, so interruption-free supply of an electrified vehicle with electrical energy is ensured even in the event of a variation in the height of the contact wires relative to each other.

The inventive current collector can be understood in principle as a conventional semi-pantograph which is expanded by particular mechanics. The expansions include at least one second upper arm which is erected with a further connecting rod, and a compensating rocker, which is used to distribute the force introduced into the lower arm in order to generate a uniform contact pressure on the contact wires.

The inventive electrified transport system has a multi-pole contact line system and at least one electrified transport vehicle with at least one inventive current collector.

The dependent claims and the following description each contain particularly advantageous embodiments and developments of the invention. In particular, the claims of one claim category can also be developed analogously to the dependent claims of another claim category. In addition, within the scope of the invention, the various features of different exemplary embodiments and claims can also be combined to form new exemplary embodiments.

In one variant of the inventive current collector, the current collector is designed for a two-pole contact line system, with the number of upper arms, contact assemblies and connecting rods being exactly two. A two-pole contact line system can be, for example, a direct current system with a positive pole and a negative pole or a supply line and a return line. Such systems are used, for example, in electrified road transport systems. They have the advantage of a smaller space requirement for the vehicle components and increased safety.

In a preferred embodiment of the inventive current collector, the at least two connecting rods are connected by joints to the central compensating rocker. The joints permit a pivoting movement of the connecting rods relative to the central compensating rocker and serve to induce a compensating movement of the compensating rocker in the event of a pulling movement or a pressure movement of the connecting rods. If, for example, a greater tensile stress acts on one of the at least two connecting rods due to a higher contact pressure of the associated current collector at one of the at least two contact wires, then a stronger tensile force is exerted on one side of the compensating rocker by the associated connecting rod. This results in a compensating movement of the compensating rocker, as a result of which the connecting rod or rods, which previously exerted a lower tensile force acting on the compensating rocker, is/are pulled downwards, in other words pulled away from the contact wire. The corresponding upper arm or the corresponding upper arms is/are moved in the direction of the associated contact wire during this process, so on the side or on the sides on which a lower contact pressure of the current collector previously prevailed, the contact pressure would accordingly be increased, whereby the different contact pressure against the at least two contact wires is compensated. The flexibility of the lower arm with its drive ensures, however, that the sum of the contact forces on the contact wires remains essentially constant.

In a particularly advantageous embodiment of the inventive current collector the at least two connecting rods are each pivotally connected to an end of a respective upper arm, which extends beyond a pivot axis between the lower arm and a respective upper arm. This arrangement has the effect that when the lower arm is erected on account of the tensile force of the connecting rods on the respective upper arm, the at least two upper arms of the current collector are erected and the two contact rockers fastened to the upper arms are pressed against the contact wires.

Preferably, the at least two connecting rods are each pivotally connected by joint bearings to a respective end of a respective upper arm, which extends beyond a pivot axis between the lower arm and a respective upper arm. Advantageously, it is possible to transmit pivoting movements between the upper arms and the connecting rods in a low-friction manner.

In one variant of the inventive current collector, the central compensating rocker is mounted on the base with a cross bearing. A cross bearing of this kind allows, for example for the case of a two-pole system with two contact assemblies and two upper arms, a pivoting movement of the compensating rocker about an axis parallel to the pivot axis of the lower arm and the upper arm as well as also perpendicularly thereto. Advantageously, the compensating rocker can participate in both the pivoting movements of the lower arm, for example on general tracking of the current collector in the case of increasing or decreasing height of the contact wires, as well as perform a compensating movement about an axis perpendicular thereto in order to pivot the two upper arms relative to each other and in this way compensate a different contact pressure of the contact rockers arranged on the two upper arms on contact wires positioned at different heights.

In one embodiment of the inventive current collector, the current collector comprises an element limiting the difference in height of the contact assemblies. With the aid of this element it is possible, for example on a transfer of a contact wire from one contact assembly to the other, when the vehicle leaves a lane, for example, in an unscheduled manner, to avoid damage to the contact line due to the action of a lateral force of the current collector on the contact wire. A simple differential height limitation of the contact assemblies is therefore produced directly between the upper arms. This ensures a possible contact wire transition from one contact assembly to the other and a synchronicity required for safety reasons is produced when the wire is inserted and removed.

In a specific variant of the inventive current collector, the element limiting the height difference of the contact rockers comprises at least one transverse rod. The transverse rod is fastened to a first upper arm of the at least two upper arms and projects into a hole of the second upper arm. The hole has a dimension which is defined as a function of a permitted height difference and which is greater than the dimension of the transverse rod. When the two upper arms move relative to each other, the transverse rod has the possibility of moving within the hole until it abuts the edge of the hole on reaching a predetermined maximum amount of a relative pivoting movement. In this way, a pivoting angle between the two upper arms is limited and therewith a maximum difference in height of the contact rockers mounted on the upper arms is also defined.

In one embodiment of the inventive current collector, the current collector has electrical insulation between at least one contact assembly and the arm elements lying underneath. A short circuit of the different potentials acquired by the different contact assemblies is thereby avoided. The insulation therefore prevents short-circuiting of differently polarized contact assemblies.

In one variant of the inventive current collector, the upper arms each have two sections separated by insulators. The insulators prevent a short-circuiting of differently polarized current collectors and thereby ensure the multi-pole nature of the system. The electrical current drawn by the current collectors can be conducted, for example, by current cables, which run along the upper arms and the lower arm, to the consumer units of a vehicle carrying the current collector.

In a specific embodiment of the inventive electrified transport system, the electrified transport system is not rail-bound. The electrified transport system is particularly preferably road-bound, with the electrified transport vehicle being a road vehicle. Road-bound vehicles change lanes in a manner inherent to their design, during which lane-changing safe clipping-on and unclipping of the current collectors should be ensured. A uniform contact pressure of the contact assemblies on the contact wires is advantageously achieved with the inventive current collector. Owing to the limitation of the height difference, damage to the current collector with a contact wire can be prevented in the case of an unintentional lane change.

BRIEF DESCRIPTION OF THE SEVERAL VIEWS OF THE DRAWINGS

The invention will be explained again in more detail in the following with reference to the accompanying figures on the basis of exemplary embodiments. In the drawings.

DESCRIPTION OF THE INVENTION

Figure 1:
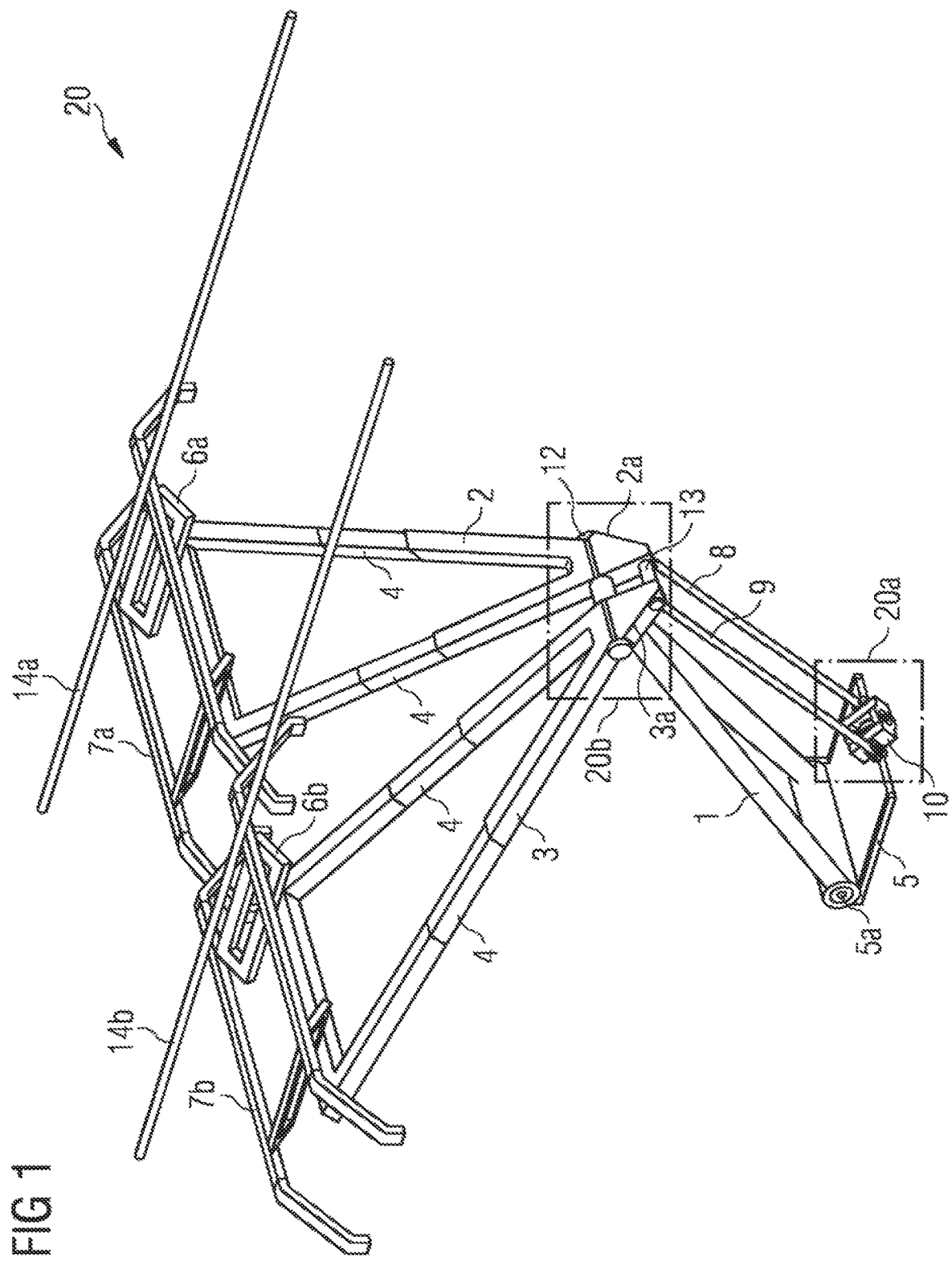
FIG. 1 shows a perspective view of a current collector according to one exemplary embodiment of the invention.
Figure 5:
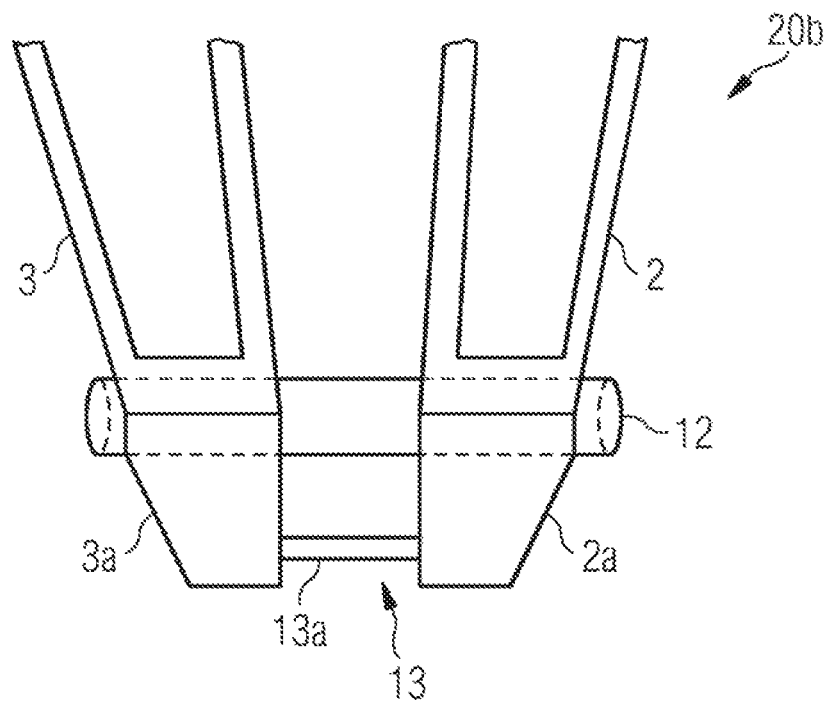
FIG. 5 shows a plan view of the two near-axis ends of the two top arms of a current collector according to one exemplary embodiment of the invention.

FIG. 1 shows a current collector 20 according to one exemplary embodiment of the invention. The current collector comprises a bottom arm 1 and two top arms 2, 3 which each comprise two sections separated by insulators 4 and are pivotally connected to the bottom arm 1 by an axle 12 arranged on the bottom arm 1. The insulators 4 prevent a short-circuiting of differently polarized contact assemblies and thereby ensure the double pole nature of the system. The electrical current drawn by the contact assemblies can be conducted, for example by current cables, which run along the top arms 2, 3 and the bottom arm 1, to the consumer units of a vehicle (not shown) carrying the current collector 20. The two top arms 2, 3 each have an end or end pieces 2a, 3a which extend beyond the axle 12 between the two top arms 2, 3 and the bottom arm 1. FIG. 5 shows a detailed illustration of a section 20b around the two end pieces 2a, 3a. The bottom arm 1 is pivotally connected to a base by an axle 5a. The base 5 can be mounted, for example, on the roof of an electrified vehicle (not shown). The contact assemblies comprise supports 6a, 6b each arranged on the end of the two top arms 2, 3 facing away from the bottom arm 1, each of which supports a wearing strip 7a, 7b which is suitable for the current take-off, with which electric current is drawn from differently polarized contact wires 14a, 14b. The two connecting rods 8, 9 are pivotally connected to the ends 2a, 3a of the two arms 2, 3 which extend beyond the axle 12 between the two top arms 2, 3 and the bottom arm 1.

In addition, the two connecting rods 8, 9 are connected by joints 15a, 15b (see FIG. 2) to a central compensating rocker 10.

Figure 2:
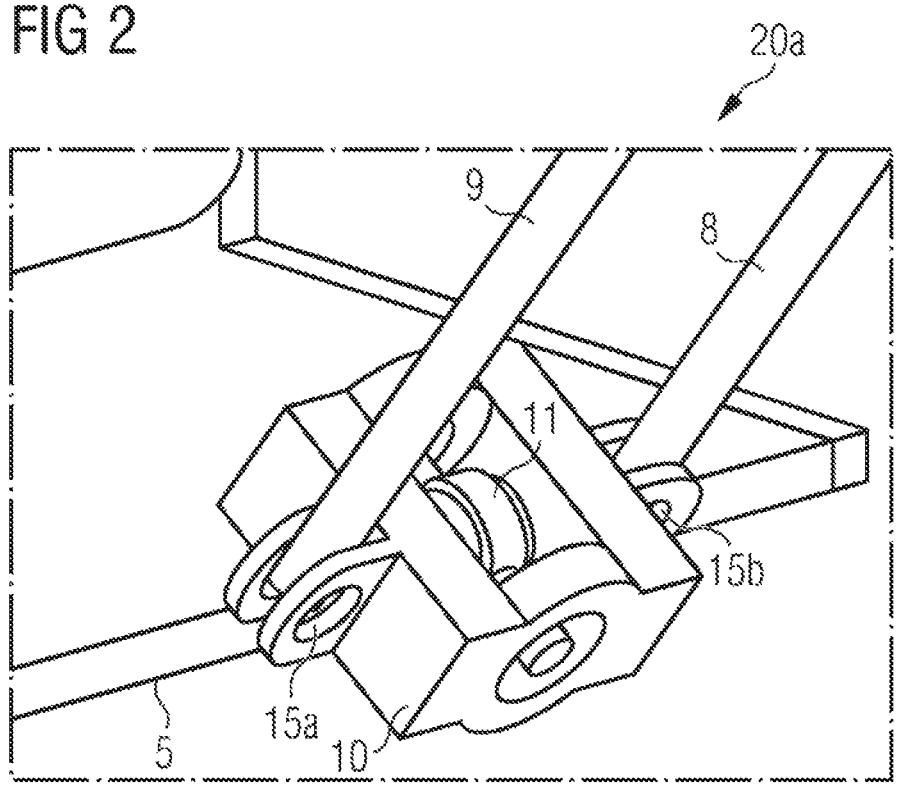
FIG. 2 shows a perspective view of a central compensating rocker of the current collector shown in FIG. 1.

As can be seen in FIG. 2 in a section representation 20a of FIG. 1, the compensating rocker 10 has a cross bearing 11 by which it is pivotally connected to the base 5. The cross bearing 11 permits both a pivoting movement of the compensating rocker 10 about an axis parallel to the axle 5a of the bottom arm 1, which is necessary for example when erecting or folding the current collector 20, as well as a pivoting movement about an axis perpendicular to the axle 5a of the bottom arm 1, with the aid of which a compensating movement for the uniform pressing of the wearing strips 7a, 7b onto the different poles 14a, 14b of a contact line is made possible. The bottom arm 1 and the top arms 2, 3 can be erected by a suitable torque on the bottom arm 1 until the contact assemblies 7a, 7b are applied to the poles 14a, 14b, also referred to as contact wires.

With the aid of the central compensating rocker 10, the contact pressure is uniformly divided between the two contact assemblies 7a, 7b even when the two contact wires 14a, 14b have a difference in height. In addition, the current collector shown in FIG. 1 also comprises a limiting element 13 for limiting the possible height difference between the two contact assemblies 7a, 7b. The limiting element 13 is arranged on the two near-axle ends 2a, 2b of the two top arms 2, 3. Limiting of the height difference is necessary in order, for example in the event of an unplanned departure from the lane by the electrified vehicle, to enable a transition of a contact wire 14a from one wearing strip 7a to the other wearing strip 7b.

Figure 3:
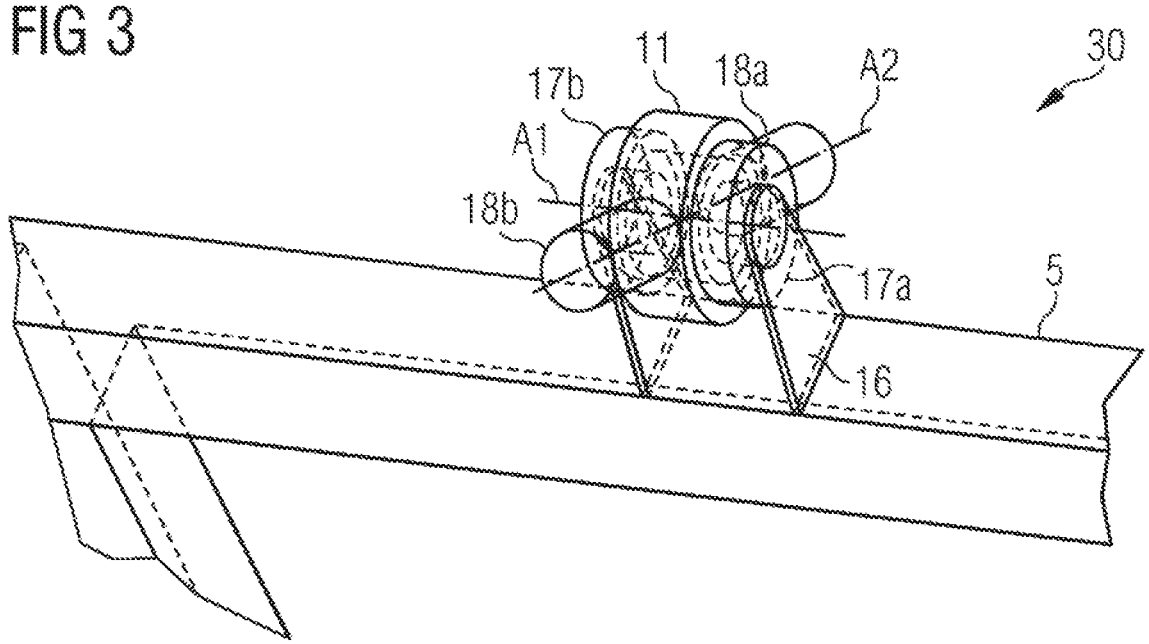
FIG. 3 shows a perspective view of a cross bearing of the central compensating rocker shown in FIG. 2.

FIG. 3 shows a perspective view 30 of the cross bearing 11 of the central compensating rocker 10 shown in FIG. 2. The cross bearing 11 is fastened to the base 5 of the current collector with the aid of a holder 16. The cross bearing 11 has two bearings 17a, 17b oriented in the transverse direction. The inner sides of the two bearings 17a, 17b oriented in the transverse direction are rotatable about a transverse axis AI, which is oriented parallel to the axis 5a of the bottom arm 1. The cross bearing 11 also has cylindrical axle elements 18a, 18b, which can be rotated about a longitudinal axis A2 which can be rotated perpendicularly to the transverse axis AI.

Figure 4:
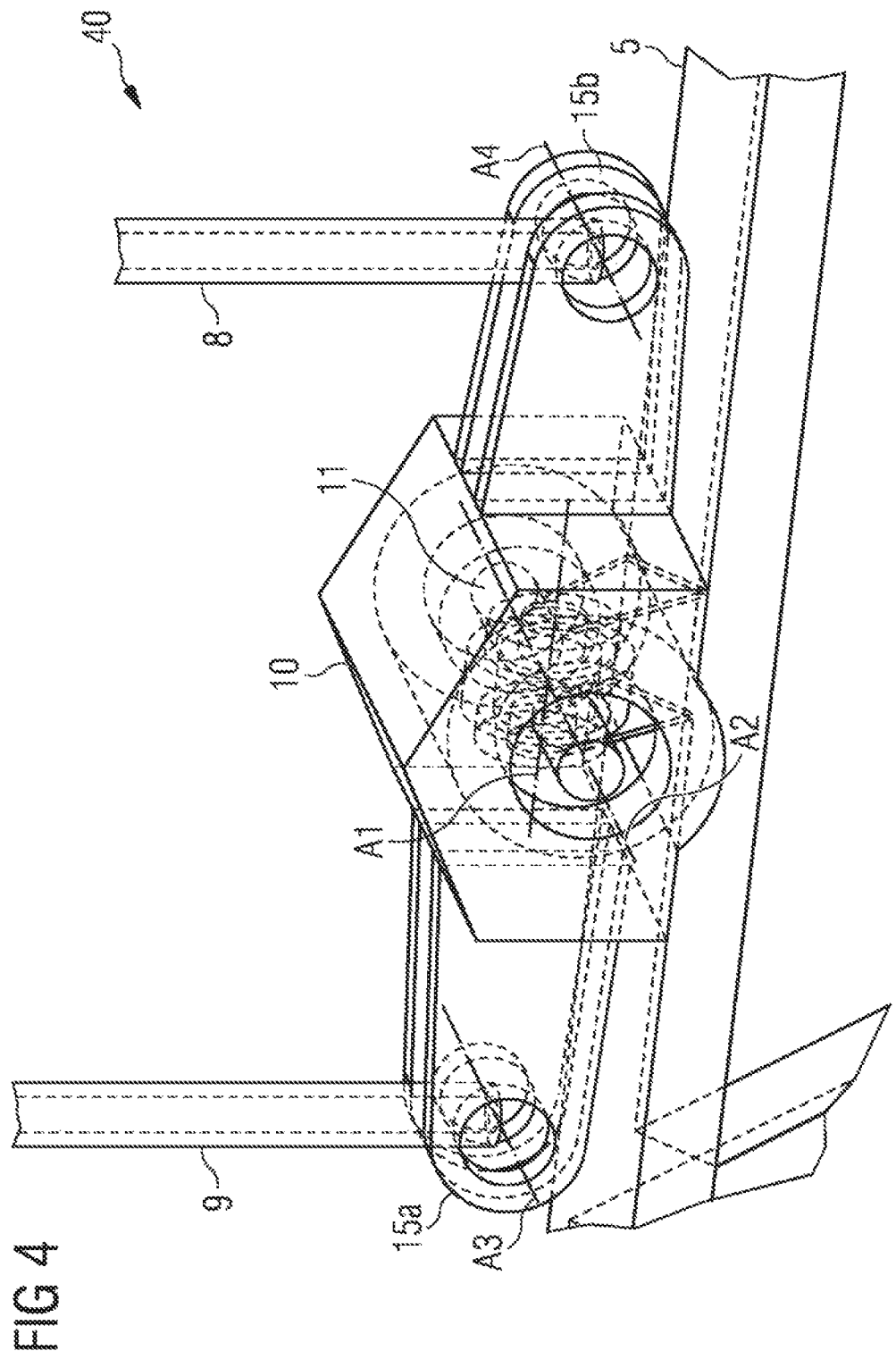
FIG. 4 shows a perspective view of a central compensating rocker.

FIG. 4 shows a perspective view 40 of a central compensating rocker 10 with the cross bearing 11 illustrated in FIG. 3. As can be seen in FIG. 4, the compensating rocker 10 can be pivoted about the two axes of rotation AI, A2 oriented orthogonally to each other. On both sides in the transverse direction the central compensating rocker 10 has the above-mentioned joints 15a, 15b in which in each case one connecting rod 8, 9 is arranged so as to be pivotal about a respective axis A3, A4 running parallel to the longitudinal axis A2 of the cross bearing 11.

FIG. 5 shows a plan view of a section 20b which has already been marked in FIG. 1. This section 20b comprises the two near-axle ends 2a, 3a of the two top arms 2, 3. As already mentioned, a maximum pivot angle and therewith a maximum difference in height between the two top arms 2, 3 is defined by a limiting element 13. The limiting element comprises a transverse rod 13a which is fixed in one of the two near-axle ends 2a, 3a, in this exemplary embodiment in the right-hand top arm 2 or its near-axle end 2a, shown on the right in FIG. 5.

Figure 6:
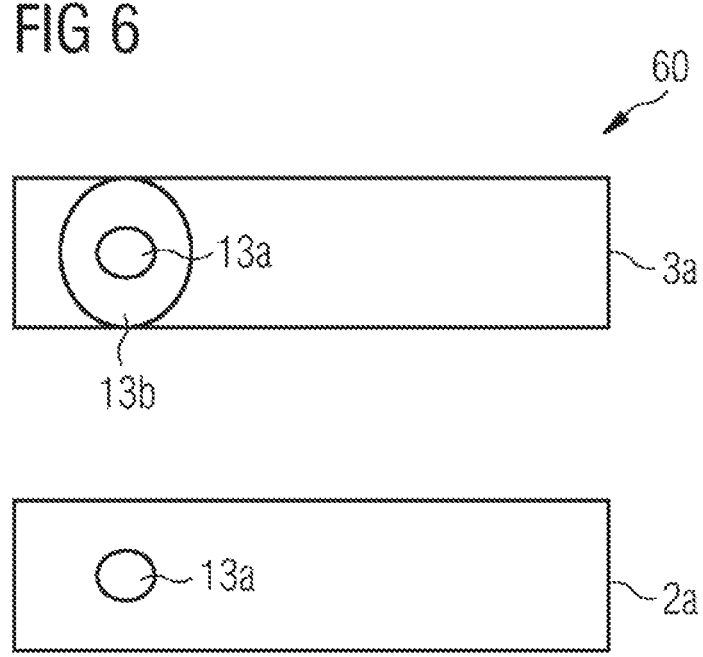
FIG. 6 shows a side view of the two near-axis ends of the two top arms of a current collector shown in FIG. 5 according to one exemplary embodiment of the invention.

As can be seen in a side view 60 in FIG. 6, in the inner side surface of the left near-axle end 3a of the left top arm 3 there is a hole 13b, whose diameter is much larger than the diameter of the transverse rod 13a. When the two top arms 2, 3 are pivoted relative to one another, the transverse rod 13a is decentered in the hole 13b until it abuts the inner wall of the hole 13b and therewith limits the pivoting angle between the two top arms 2, 3.

In conclusion, it should be pointed out once again that the above-described devices are only preferred exemplary embodiments of the invention and that a person skilled in the art can vary the invention without departing from the scope of the invention insofar as it is specified by the claims. For example, the inventive current collector can also be used in rail-based transport systems. It is also pointed out for the sake of completeness that the use of the indefinite articles "a" or "an" does not preclude the features in question from also being present several times.

The invention claimed is:
1. A current collector for a multi-pole contact line system, the current collector comprising:
   a base;
   a lower arm pivotally mounted on said base and having an end opposite said base;
   at least two upper arms pivotally mounted relative to one another on said end of said lower arm opposite said base, said at least two upper arms including at least one first upper arm and at least one second upper arm, said at least one second upper arm having a hole formed therein;

at least two separate contact assemblies disposed on said upper arms and are associated with different poles of a contact line;

a central compensating rocker disposed on said base;

at least two connecting rods each having a first end pivotally connected to said central compensating rocker respectively and a second end pivotally connected to one of said at least two upper arms respectively; and an element limiting a difference in height of said at least two separate contact assemblies, said element limiting the difference in height of said at least two separate contact assemblies having at least one transverse rod being fastened to said at least one first upper arm and projecting into said hole in said at least one second upper arm, wherein said hole having a dimension being defined in dependence on a permitted difference in the height which is larger than a dimension of said transverse rod.

2. The current collector according to claim 1, wherein:
the multi-pole contact line system is a two-pole contact line system; and
a number of said upper arms, said contact assemblies and said connecting rods is exactly two.

3. The current collector according to claim 1, wherein said central compensating rocker has joints and said two connecting rods are connected to said central compensating rocker by means of said joints.

4. The current collector according to claim 1, wherein:
said two connecting rods are each pivotally connected to an end of a respective one of said upper arms; and
said end of said respective upper arm extends beyond a pivot axis disposed between said lower arm and said respective upper arm.

5. The current collector according to claim 1,
further comprising joint bearings, said two connecting rods are each pivotally connected by said joint bearings to a respective end of a respective one of said upper arms; and
wherein said respective end of said respective upper arm extends beyond a pivot axis disposed between said lower arm and said respective upper arm.

6. The current collector according to claim 1, wherein said upper arms each has two sections which are separated by insulators.

7. A current collector for a two-pole contact line system, the current collector comprising:
a base;
a lower arm pivotally mounted on said base and having an end opposite said base;
at least two upper arms pivotally mounted relative to one another on said end of said lower arm opposite said base;
at least two separate contact assemblies disposed on said upper arms and are associated with different poles of a contact line;
a central compensating rocker disposed on said base;
at least two connecting rods each having a first end pivotally connected to said central compensating rocker respectively and a second end pivotally connected to one of said at least two upper arms respectively, wherein a number of said upper arms, said contact assemblies and said connecting rods is exactly two; and
a cross bearing, said central compensating rocker being mounted on said base with said cross bearing.

8. The current collector according to claim 7, further comprising an element limiting a difference in height of said contact assemblies.

9. The current collector according to claim 8, wherein:
said at least two upper arms include at least one first upper arm and at least one second upper arm, said at least one second upper arm having a hole formed therein; and
said element limiting the difference in height of said contact assemblies has at least one transverse rod which is fastened to said at least one first upper arm and projects into said hole in said at least one second upper arm, wherein said hole has a dimension which is defined in dependence on a permitted difference in height which is larger than a dimension of said transverse rod.

10. An electrified transport system, comprising:
a multi-pole contact line system; and
at least one electrified transport vehicle having at least one current collector, said at least one current collector containing:
a base;
a lower arm pivotally mounted on said base and having an end opposite said base;
at least two upper arms pivotally mounted relative to one another on said end of said lower arm opposite said base, said at least two upper arms including at least one first upper arm and at least one second upper arm, said at least one second upper arm having a hole formed therein;
at least two separate contact assemblies disposed on said upper arms and are associated with different poles of a contact line;
a central compensating rocker disposed on said base;
at least two connecting rods each having a first end pivotally connected to said central compensating rocker respectively and a second end pivotally connected to one of said at least two upper arms respectively; and
an element limiting a difference in height of said at least two separate contact assemblies, said element limiting the difference in height of said at least two separate contact assemblies having at least one transverse rod being fastened to said at least one first upper arm and projecting into said hole in said at least one second upper arm, wherein said hole having a dimension being defined in dependence on a permitted difference in height which is larger than a dimension of said transverse rod.

11. The electrified transport system according to claim 10, wherein the electrified transport system is not rail-bound and said electrified transport vehicle is a non-rail-bound vehicle.

12. The electrified transport system according to claim 11, wherein the electrified transport system is road-bound, and said electrified transport vehicle is a road vehicle.

* * * * *